Nov. 21, 1933. J. C. HUNTER 1,936,512
MULTIPLYING ATTACHMENT FOR CAMERAS
Filed Feb. 21, 1933 2 Sheets-Sheet 1
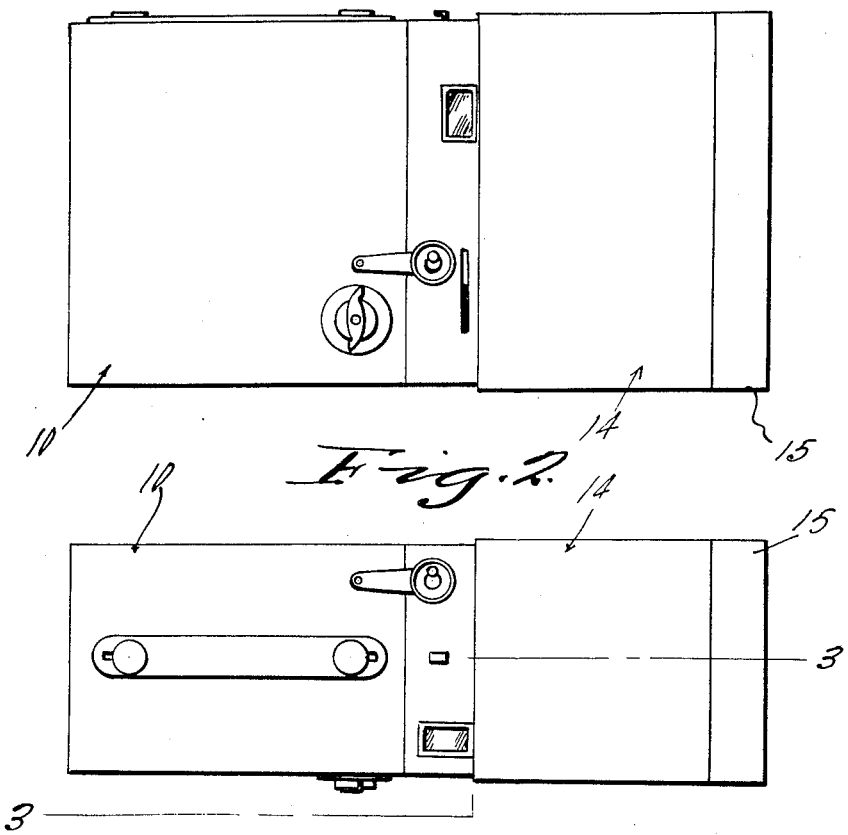
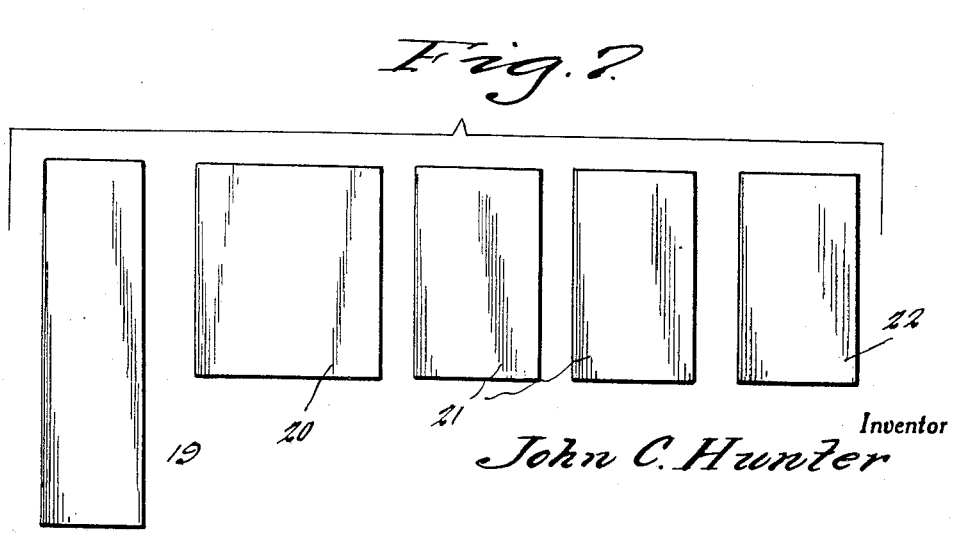
Inventor
John C. Hunter
By Clarence A. O'Brien
Attorney Nov. 21, 1933.  J. C. HUNTER  1,936,512
MULTIPLYING ATTACHMENT FOR CAMERAS
Filed Feb. 21, 1933    2 Sheets-Sheet 2
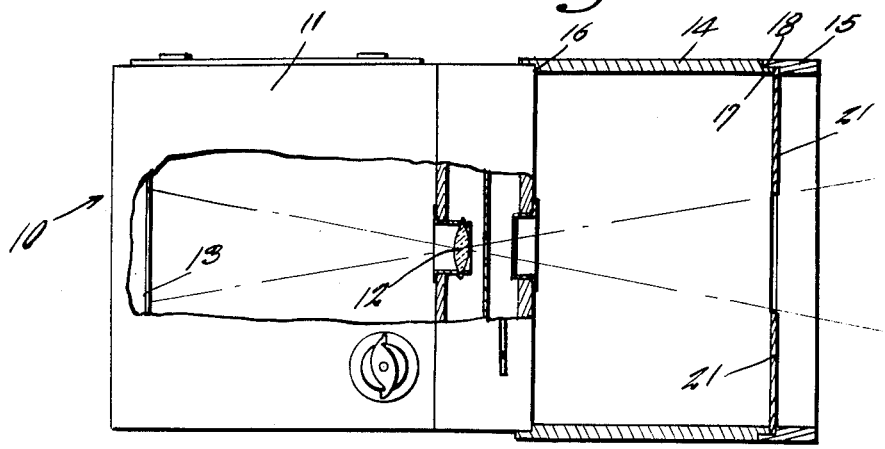
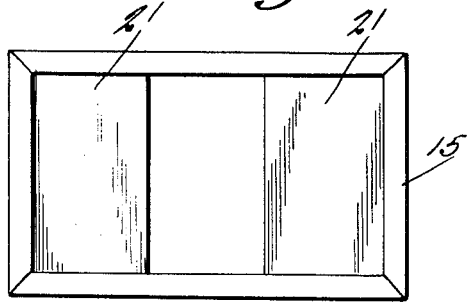
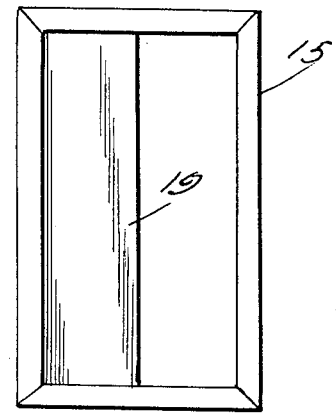
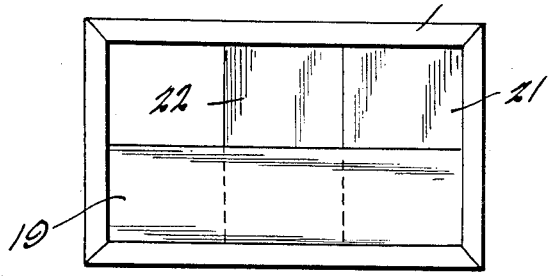
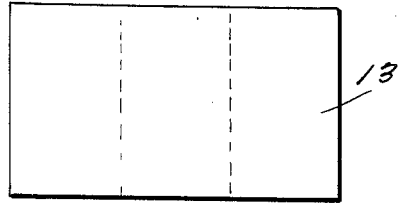
Inventor
John C. Hunter
By Clarence A. O'Brien
Attorney Patented Nov. 21, 1933

1,936,512

UNITED STATES PATENT OFFICE 1,936,512

MULTIPLYING ATTACHMENT FOR CAMERAS

John Chestley Hunter, Old Hickory, Tenn.

Application February 21, 1933. Serial No. 657,860

5 Claims. (Cl. 95—36)

This invention has reference to camera attachments, having particular reference to box cameras and a multiplying attachment therefor.

More particularly the invention consists in the provision of an improved device for application to the box camera by which multiple exposures or pictures may be made on one negative.

Further, in accordance with the present invention the attachment may be readily associated with the box of the camera without in any wise requiring an alteration in the construction of the camera and which, when properly positioned relative to the camera will support one or more screens a distance in front of the lens of the camera substantially equal to the distance between the lens and the sensitized film or holder therefor.

Briefly the invention consists in the provision of an attachment of the kind described comprising a frame having as an integral part thereof means for clamping one or more screens at the desired position or positions across the frame; together with a plurality of screens varying relative to one another in longitudinal and transverse dimensions and capable of being used singly or in groups dependent upon the number and sizes of the exposures or pictures to be made on the one negative.

The invention together with its numerous objects and advantages will be best understood from a study of the following description, taken in connection with the accompanying drawings wherein:

Figure 1 is a side elevational view of a box camera having the attachment applied thereto.

Figure 2 is a top plan view thereof.

Figure 3 is a sectional elevational view taken substantially on the line 3—3 of Figure 2.

Figure 4 is a front end elevational view of the attachment illustrating the use of two screens.

Figure 5 is a view similar to Figure 4 illustrating the use of a single screen differing in dimensions from the screens shown in Figure 4.

Figure 6 is a like view showing the use of three screens where it is desired to make six exposures.

Figure 7 is a plan view of the several screens and

Figure 8 is an elevational view of a sensitized film illustrating how the entire film may be used up in making three exposures.

Referring to the drawings by reference numerals it will be seen that 10 indicates generally a conventional photographic box camera which includes among other parts the box or casing 11 and lens 12. 13 indicates a sensitized film the same, in Figure 3 being shown arranged within the camera.

The attachment in accordance with the present invention comprises a frame of substantially the same shape in cross section as the box 11 and having relatively wide flat sides. Said frame, in the present instance has the sides thereof divided transversely adjacent one end of the frame to provide complemental frame sections 14, 15, one section, in the present instance section 14 having the sides thereof relatively broad and flat, while the other section, in this instance 15 has the sides flat and relatively narrow.

The sides of the frame section 14 at one end have the edges thereof rabbeted as at 16 to the telescopically engage the front end of the box 11 of the camera, the rabbeting of the edges forming at said end of the frame a continuous internal shoulder that abuts the front face of the box for limiting inward movement of the frame relative to the camera.

At the meeting edges thereof the sides of the frame sections 14, 15 are rabbeted complementary to one another as at 17, 18 to provide a joint between the sections that will serve also for securing one or more screens in the desired position within the confines of the frame.

In this connection it will be noted that the frame section 14, at 17, is rabbeted externally to provide a continuous forwardly projecting rib while the frame section 15, at 18, is rabbeted internally to provide a continuous groove receiving the screen and also for receiving the aforementioned projected tongue of the frame section 14 to thereby provide an efficient joint between the sections capable of also serving as a means for securing one or more of the screens at the desired position.

In the present instance it is proposed to use as a part of the attachment five individual screens including an oblong screen 19, a substantially square screen 20, a pair of substantially rectangular screens 21 corresponding one with the other in length and width, and a fifth screen 22 which is of slightly less width than the screens 21 but of substantially the same length as said screens 21.

In actual practice the frame is longitudinally separated after which a screen or group of screens is arranged in the groove formed by the rabbeted edge 18 of the frame section 15. The tongue formed by the rabbeted edge 17 of the frame section 14 is then introduced into the said groove for joining the sections of the frame and for securing the screen or screens in position.

The frame with the sections thus joined and the screens properly arranged therein has the rabbeted end 16 thereof next telescopically engaged over the front end of the camera box 11 so that the frame projects forwardly from the camera box for positioning and holding the screen or screens in advance of the camera lens 12 a distance substantially equal to the distance between the lens 12 and a sensitized screen 13.

In Figure 8 there is shown a sensitized film on which three exposures have been made, each exposure covering one-third of the film. When such exposures are desired the plates 21 are first used and are positioned in the frame and spaced laterally from one another as suggested in Figure 4 for the purpose of first making the center exposure. After the center exposure is made one of the plates 21 is removed and the plate or screen 22 substituted therefore and moved into lateral edge engagement with the remaining one of the screens 21, the said screens 21 and 22 being first located adjacent one end of the frame for making an exposure on one third of the film at one end thereof after which the said screens are slid toward the other end of the frame for taking an exposure on the remaining one-third end portion of the film. In this connection it will be noted that screen 22 being of slightly less width than the screens 21 will insure upon use of a screen 21 with a screen 22 of but a one-third portion of the film being available for a single exposure.

In Figure 5 I have shown one use to which the screen 19 may be put. In this connection it will be obvious that the screen 19 is used for exposing one half of the film so that two pictures may be taken side by side. Thus in Figure 6 I have shown the use of one screen 21, screen 22 and screen 19 whereby six exposures or pictures may be taken on the one film.

In actual practice the frame may be formed of any suitable material, wood, metal, composition or the like and the inner faces of the sides of the frame are preferably painted black while the exterior faces of said sides of the frame may be of any color or combination of colors to correspond with the color of the camera. It will also be noted that there is a snug fit between the frame and the camera, and between the several sections of the frame so as to preclude the admission of light except through the front of the attachment, and the focal distance between the lens and the screens, and between the lens and the negative or sensitized film may be maintained uniform while the screens when properly used will define clean cut lines between exposures.

Even though I have herein shown and described the preferred embodiment of the invention, it is to be understood that the same is susceptible of further changes, modifications and improvements coming within the scope of the appended claims.

Having thus described my invention, what I claim as new is:

1. The combination with a photographic camera, of a frame having telescoped sections mounted on the front of the camera, and a screen or screens secured in the frame at the telescoped ends of the frame sections.

2. The combination with a photographic camera, of a frame section having broad flat sides the edges of which are rabbeted at the opposite ends of the section, said section having one end thereof telescopically engaged with the front of the camera box; a second frame section having relatively narrow flat sides the edges of which at one end are rabbeted complementary to the rabbeted edges of the sides of the first section at the free end of the latter and have telescopic engagement therewith, to secure a screen or screens at the inter-engaged ends of the frame sections, and screens varying in dimensions adapted for selective use with the frames singly and in groups.

3. A multiplying attachment for cameras comprising a pair of complemental frames, one of which has the sides thereof at one end rabbeted internally to provide a groove extending about the frame and adapted to receive a screen therein, a screen extending across the frame and engaged in the groove; and the other of said frames having its sides, at one end, externally rabbeted to provide a projected rib engaging in the groove of the said one frame to clamp the screen in position.

4. A camera attachment comprising a screen supporting frame having broad flat sides transversely separated adjacent one end of the frame and complementarily rabbeted to provide for the clamping of a screen within the frame at the meeting edges of said sides of the frame.

5. In combination with a photographic camera box, a frame mounted on the front end of the camera box and having its sides projecting from the box for a distance substantially equal to the distance between the lens and the film holder of the camera, and means on the front end of the frame for securing a screen in position across the frame.

JOHN CHESTLEY HUNTER.